March 26, 1957

R. J. KUTZLER 2,786,973

CONTROL APPARATUS

Filed Nov. 9, 1951

INVENTOR.
ROBERT J. KUTZLER
BY
George H Fisher
ATTORNEY

United States Patent Office 2,786,973
Patented Mar. 26, 1957

2,786,973

CONTROL APPARATUS

Robert J. Kutzler, Minneapolis, Minn., assignor to Minneapolis-Honeywell Regulator Company, Minneapolis, Minn., a corporation of Delaware Application November 9, 1951, Serial No. 255,580

14 Claims. (Cl. 318—19)

My invention relates to electric motor control apparatus for controlling a motor or control device in response to rate of change and magnitude of change in a condition.

Generally, control apparatus which controls in response to magnitude of change and rate of change of condition requires separate devices to provide the magnitude and rate controlling signals and such signals are not usually adjustable as to the controlling effect in the system in which they control. This is particularly true when an alternating current source is employed, since it is not convenient to use an electronic differentiating circuit as with direct current. In the aircraft control field where alternating curent sources are often used to energize the control systems, this is particularly true and such control apparatus employs separate rate and displacement type of sensing devices which operate independently of one another to supply independent controlling signals to their cooperating control apparatus to give an overall controlling effect. In the improved control apparatus of the subject invention, a single sensing device may be employed which will provide either rate or displacement types of control signals to an associated network or a proportionate amount of both types of signals depending upon an adjustable device associated therewith. With the present invention it is possible to provide in an alternating current type of automatic pilot control for aircraft, for example, an arrangement in which a single displacement type of controller can be utilized to provide displacement type of control or a combination of the two.

Therefore it is an object of the present invention to provide an improved alternating current type of control apparatus in which rate and displacement type of control is obtained from a single controller.

It is also an object of this inventon to provide an apparatus capable of producing a synthetic type of rate signal for controlling purposes from a device which would normally respond to magnitude of displacement only.

It is further an object of this invention to provide a control apparatus of this type in which rate and magnitude control signals are combined and adjustably proportioned as to controlling effect, the signals originating from a single sensing device.

Figure 1:
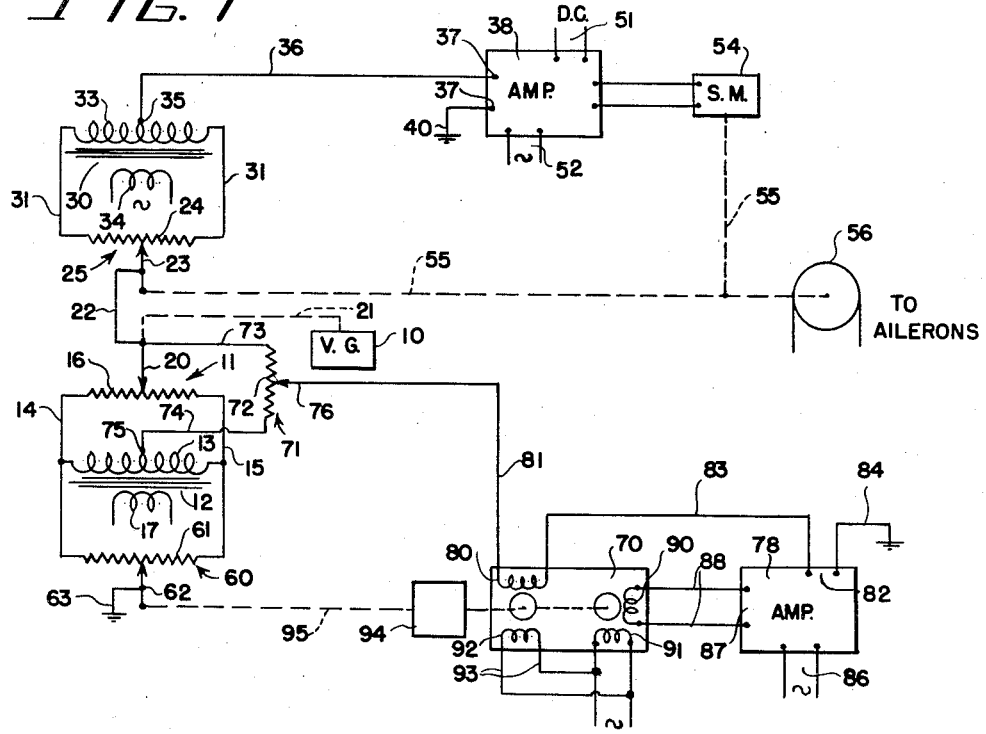
Figure 2:
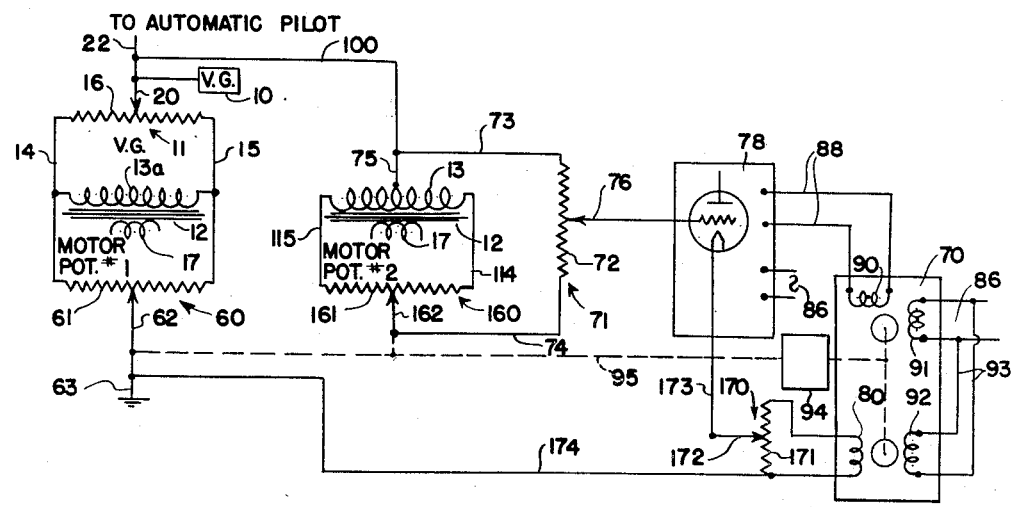

These and other objects of this invention will become apparent from reading the attached description together with the drawings wherein:

Figure 1 is a schematic disclosure of the preferred embodiment of the subject invention, and Figure 2 is a schematic disclosure of another embodiment of the subject invention.

The present invention will be hereinafter described in conjunction with the limited disclosure of a single channel of an automatic pilot control system for an aircraft. It should be noted, however, that this disclosure is intended to be illustrative only of one of the uses for which the subject invention is applicable.

The apparatus disclosed in Figure 1 includes a network having a vertical gyroscope 10 controlling a potentiometer or signal generator 11 energized from a transformer 12 the secondary winding 13 of which is connected by conductors 14, 15 to the extremities of potentiometer winding 16 of potentiometer 11. Transformer 12 has its primary winding 17 energized from an alternating current source of power. The potentiometer or generator 11, which will hereinafter be described as a vertical gyroscope potentiometer, has a wiper 20 which is operatively connected to the roll axis of the vertical gyroscope by suitable mechanical connection means indicated at 21 and is electrically connected by means of a conductor 22 to a wiper 23 of a balancing or follow-up potentiometer 25 of the automatic pilot control system. Balancing or follow-up potentiometer 25 has a winding 24 which is energized from a transformer 30 through conductors 31, 32 which connect the extremities of winding 24 to a secondary winding 33 of transformer 30. Transformer 30 includes a primary winding 34 which is also energized from the same alternating current source of power as winding 17. Transformer secondary winding 33 is center tapped as at 35, the center tap being connected by a conductor 36 to an input terminal 37 of an amplifier indicated schematically at 38. The other input terminal to the amplifier is grounded as at 40. Amplifier 38 is shown in block form herein since it forms no part of the subject invention and it is to be understood that any type of A. C. amplifier may be utilized herein which is adaptable to control of a motor. The present disclosure is intended to cover an A. C. amplifier utilizing a pair of discriminating relays to control the energization of a D. C. servo motor indicated at 54, the servo motor being energized from a D. C. source 51 through a pair of relays not shown. In addition to the signal input terminals 37, the amplifier also includes an A. C. source 52 forming part of the same source as that to which primaries 17 and 34 are connected. Reference is made to the Gille Patent 2,425,733 dated August 19, 1947, for a disclosure of this device. The servo motor 54 which is controlably energized by the amplifier 38 drives, through a suitable connection indicated at 55, a pulley or cable drum indicated at 56 which mounts the control cables to the aileron control surfaces of an aircraft. The mechanical connection 55 of the servo motor also drives the rebalancing potentiometer wiper 23 of the balancing potentiometer 25.

The apparatus disclosed above is a limited disclosure of an automatic pilot control apparatus which when operated would give a displacement type of control or a control of the servo motor operating the ailerons in proportion to magnitude of displacement about its roll axis of the craft upon which the apparatus is mounted. In addition to the apparatus described, the subject invention provides a second balancing potentiometer 60 having a winding 61 connected at its extremities to the conductors 14, 15 to form a Wheatstone bridge circuit with the vertical gyroscope potentiometer 11 and energizable from the transformer secondary 13 of transformer 12. Balancing potentiometer 60 has a wiper 62 which is grounded as at 63 to complete the control circuit for the automatic pilot apparatus to amplifier 38 as follows: grounded potentiometer wiper 62 to winding 61 and conductors 14, 15, transformer secondary 13, vertical gyroscope potentiometer winding 16, wiper 20 of the vertical gyroscope potentitometer 11, conductor 22, wiper 23 of balancing potentiometer 25, winding 24 of the balancing potentiometer, conductors 31 to transformer secondary 33, center tap 35 of transformer secondary 33, and conductor 36, to input terminals 37 of amplifier 38 and ground connection 40. As will be hereinafter noted, the wiper 62 of potentiometer 60 is normally centered on the potentiometer winding 61 and hence under normal operation or the specific operation to be later noted the potentiometer 60 has no effect on the autopilot control circuit other than to complete the circuit therethrough. The only movable control apparatus for this type of operation, which will be magnitude of displacement type of control, is the vertical gyroscope potentiometer wiper 20 together with the servo balance potentiometer wiper 23 which operates to balance out the signal of the vertical gyroscope potentiometer as the servo motor 54 is energized and the control surface is operated.

The balancing potentiometer 60 has its wiper 62 operatively connected to a second servo motor 70 which is controllably energized by a signal derived from a voltage divider arrangement indicated at 71. The voltage divider has a winding 72 which is connected at one extremity by a conductor 73 to the wiper 20 of the vertical gyroscope potentiometer 11 and at the other extremity by a conductor 74 to a center tap 75 of the secondary winding 13 of transformer 12 which energizes the vertical gyroscope potentiometer and the balancing potentiometer heretofore described. A wiper 76 of the voltage divider 71 is connected to an amplifier 78 through a secondary winding 80 of a speed responsive generator which is mounted on and operated by the servo motor 70. A conductor 81 connects one extremity of secondary winding 80 of the speed responsive generator to wiper 76 while the other extremity is connected to one of a pair of input terminals 82 of amplifier 78 by a conductor 83. The other input terminal 82 of the amplifier 78 is grounded, as at 84. Amplifier 78 is also shown herein in block form for simplicity since its details do not form any part of this invention and it is intended that it be of the conventional alternating current type having an output which is phase sensitive and variable in magnitude depending upon the phase and magnitude of the input signal. Power supply terminals are indicated at 86 and are intended to be energized from an alternating current source of power. Output terminals 87 of the amplifier 78 are connected through conductors 88 to one phase winding 90 of the servo motor and which is also indicated in block form. The servo motor 70 is intended to be of the two phase alternating current induction motor type having the winding 90 energized from the amplifier and a winding 91 energized directly from an alternating line supply. The speed responsive generator mounted thereon and operated thereby has a primary winding 92 which is also energized from an alternating current supply through conductors 93, this generator being of the type disclosed in the Riggs Patent 2,408,813 dated October 8, 1946. As indicated above, the secondary winding 80 of the velocity or speed responsive generator is connected in a degenerative feed-back type of circuit with the amplifier and input signal from the voltage divider 71, this circuit being conventional. The servo motor 70 also includes an output shaft and gear train 94, the output shaft 95 being connected as previously indicated to the wiper 62 of balancing potentiometer 60.

As indicated above, the operation of the control network and the autopilot apparatus or system under conditions when the balancing potentiometer 60 is centered is conventional with aircraft control systems. This situation exists when the servo motor 70 is de-energized and the wiper 62 is centered on potentiometer winding 61. Upon displacement of the aircraft, the vertical gyroscope potentiometer wiper 20 moves relative to the winding 16 to set up a signal in the network which energizes amplifier 38 to cause rotation of automatic pilot servo motor 54 to move the control surfaces and adjust the servo rebalance potentiometer 25 or its wiper 23 relative to the winding 24 to balance out the automatic pilot network signal. As the control surfaces move through the operation of the servo motor 54, the aircraft will also change attitude bringing about displacement of the vertical gyroscope wiper relative to its winding 16 due to the inherent stability of the vertical gyroscope 10. Thus the operation of the vertical gyroscope caused by movement of the aircraft and the movement of the servo balance potentiometer will tend to counteract the original signal supplied by the vertical gyroscope potentiometer and the network will reach a balance condition de-energizing the amplifier 38.

Assuming now that the wiper 76 of the voltage divider 71 is located at its lowermost extremity as shown in Figure 1 or substantially in contact with the center tap 75, it will be seen that the voltage potential at this wiper will be substantially that existing at wiper 62 of balancing potentiometer 60. Under these circumstances regardless of the movement of the vertical gyroscope potentiometer 11 or its wiper 20 relative to its winding 16, no signal will be applied to the amplifier 78. Therefore, the servo motor 70 will not be energized and the velocity generator associated therein will not have a voltage generated in its secondary winding 80. The energizing circuit for the amplifier 78 is as follows: voltage divider winding 72 which is connected to the vertical gyroscope potentiometer wiper 20 and the center tap 75 of transformer 12 to wiper 76, conductor 81, secondary winding 80 of the speed responsive generator, conductor 83, to input terminal 82 of the amplifier 78 and grounded input terminal 84 of amplifier 78, ground 63 of wiper 62 of the balancing potentiometer 60, winding 61, and conductors 14, 15 which are connected to the transformer 12. Thus in the lower wiper position of the voltage divider 71, it will be seen that the autopilot control system will receive only displacement type signals from a vertical gyroscope potentiometer and the operation of the system will be as described above.

Assume now that the wiper 76 of voltage divider 71 is located at the uppermost extremity as shown in Figure 1 of winding 72 of the voltage divider or substantially in contact with the wiper 20 of vertical gyroscope potentiometer 11. As before, any displacement of the wiper 20 of the vertical gyroscope potentiometer 11 will cause energization of the winding 72 of the voltage divider 71. The displacement signal from the vertical gyroscope potentiometer 11 will thus be impressed on the amplifier 78 to cause energization of the amplifier phase winding 90 of the servo motor 70, the line phase winding 91 being continuously energized, to thereby cause rotation of the servo motor output shaft through its gear train 94 to operate or move the wiper 62 of the balance potentiometer 60, as well as set up in the secondary winding 80 of the speed responsive generator a signal in opposition to that supplied by the voltage divider. As previously indicated, the servo motor 70 is of the variable speed type and reversible in operation depending upon the magnitude and phase of the energization of the amplifier 78. As the speed of the servo motor builds up due to the increase in energization of the input signal to the amplifier 78 the output of the speed responsive generator introduces an increased opposing signal to that from the voltage divider and the difference between these two signals causes the operation of the servo motor to position the wiper 62 on its winding 61 at a variable rate proportional to this overall energization. With the wiper 62 now displaced relative to the center point or normal voltage position of the balancing potentiometer another signal will be introduced into the autopilot control system to counteract that of the vertical gyroscope and the difference between this signal and the displacement signal of potentiometer 11 will tend to be proportional to the rate of roll or rate of displacement of the aircraft or vertical gyroscope. In actual practice, the displacement of the vertical gyroscope potentiometer wiper 20 and the wiper 62 of the balancing potentiometer will be substantially simultaneous and the two will be variably positioned with respect to their associated windings with a relative difference in position between them to give an overall output signal from the bridge network which is substantially in proportion to the output of the speed responsive generator. With the present location of the voltage divider wiper 76 this signal will be a synthetic rate signal and will tend to be in proportion to the rate at which the aircraft is being displaced relative to the vertical gyroscope. It will also be understood that a change in direction of displacement of the aircraft relative to the gyroscope or a change in the rate at which the aircraft is being displaced will vary the relative positions of the two wipers inasmuch as the servo motor 70 will continue to run as long as a potential exists between the voltage divider wiper 76 and that of the balancing potentiometer wiper 62. Further, whenever the craft returns to a normal position relative to the vertical gyroscope, the servo motor will be so energized as to return its associated balancing potentiometer wiper 62 to its normal position.

At any intermediate position of the wiper 76 along the voltage divider winding 72, it will be seen that variable proportions of the signal set up initially by the displacement of the vertical gyroscope potentiometer will be supplied to the amplifier 78. These different levels of signals will be supplied to the amplifier 78 and will cause the servo motor 70 to operate at proportionately lower speeds, and hence the wiper 62 will move relative to the winding 61 of balancing potentiometer 60 to give proportionately less balancing effect to the original vertical gyroscope potentiometer signal. The overall effect upon the autopilot circuit will be such that that portion of the signal it receives from the bridge circuit comprising the vertical gyroscope potentiometer 11 and the balancing potentiometer 60 will be made up in part of the rate signal and in part of the displacement signal the relative magnitudes of which will be determined by the position of wiper 76 on winding 72.

In the modification shown in Figure 2, the portions of the automatic pilot apparatus which includes the servo motor 54, its energizing amplifier 38 and the servo balance potentiometer 25 as well as the servo cable drum 56 have been omitted for simplicity but it is to be understood that this modification is to be described in connection therewith. In the present modification, the vertical gyroscope potentiometer 11 is connected with the balancing potentiometer 60 in a conventional Wheatstone bridge circuit which is energized by transformer 12 through a secondary winding 13a which in this modification has no center tap. Wiper 62, as in the previous modification, is grounded at 63, and the vertical gyroscope potentiometer wiper 20 is connected by a conductor 22 to the servo balance potentiometer 25 (not shown) in the manner described above. The vertical gyroscope potentiometer wiper 20 is also connected by means of a conductor 100 to the tapped secondary winding 13 of transformer 12 which in this modification is connected by conductors 114 and 115 to a second balancing potentiometer 160 at the extremities of its winding 161. The secondary winding 13 is tapped as at 75 at which point the conductor 100 is connected. The second balancing potentiometer 160 has a wiper 162 associated therewith and driven by motor 70. Wiper 162 is connected to one extremity of the voltage divider winding 72 by conductor 74, the opposite extremity of the windings 72 being conducted to the tap 75 of secondary winding 13 by conductor 73. In the present modification, the wiper 76 of voltage divider 71 is connected directly to the grid of a tube of the amplifier 78 rather than in series with the output coil of the speed responsive generator. Amplifier 70 is again shown in block form being of the alternating current type having an A. C. power input 86 and a pair of output terminals 88 which are connected to the amplifier phase winding 90 of the servo motor 70. Amplifier 78 is the same as that disclosed in the modification above but the energizing circuit differs in that it employs a cathode feedback arrangement for the output coil 80 of the velocity generator which arrangement is also conventional and is disclosed herein as a second or alterntive method of feeding back the speed responsive generator signal to the amplifier. Servo motor 70 in this modification also includes line winding 91 energized from an alternating current source of power 86 and in addition mounts the velocity generator or speed responsive generator whose input winding 92 is energized from the alternating current source of power by conductors 93. Output coil 80 of the speed responsive generator is connected in the cathode circuit of the input stage of the amplifier 78 which is shown only schematically in the drawings through a voltage divider 170, the winding 171 of which is connected to the output terminals of the winding 80 and the wiper 172 of which is connected by means of a conductor 173 to the cathode of the input stage of the amplifier 78. One extremity of the voltage divider winding 171 is connected by means of a conductor 174 to the grounded connection 63 of wiper 62 of balancing potentiometer 60.

The operation of the modification of Figure 2 is substantially the same as that of Figure 1 upon the automatic pilot control apparatus with the exception as will be hereinafter noted, that the conditions do not arise whereby pure displacement of the vertical gyroscope potentiometer wiper will alone control the servomotor. That is to say, the condition could not be reached with the present modification wherein a control servomotor 70 will remain deenergized upon displacement of the vertical gyroscope relative to the aircraft. As heretofore noted, displacement of the vertical gyroscope wiper relative to its winding 16 will set up an unbalance in the bridge circuit formed by the vertical gyroscope potentiometer 11 and the first balancing potentiometer 60. This signal is impressed across the voltage divider 71 as before through conductors 100 and 73, amplifier 78, conductors 173, voltage divider 171, and conductor 174 to the grounded balancing potentiometer wiper 62. It will also be noted that this signal will be effected by the position of the second motor balancing potentiometer 160 which is energized by the tapped transformer secondary 13 through the tap connection 75. This second motor balancing potentiometer 160 when its wiper 162 is displaced will operate to set up a second signal across the voltage divider 71 in opposition to that signal produced by the displacement of the vertical gyroscope wiper 20. However until the servomotor 70 is operative and moves the wiper 162 of the second balancing potentiometer 160, its wiper is normally centered with respect to the tap 75 and voltage will not be present in this output circuit. Assuming now that the wiper 76 is located at the upper extremity of winding 72 of voltage divider 71, it will be seen that the full signal from the displacement of the vertical gyroscope potentiometer 11 will be impressed on the grid of the first stage of application of amplifier 78. Since the output from the second balance potentiometer 160 and transformer secondary 113 is zero at this point, this full signal will cause the servomotor 70 to operate at its maximum rate of rotation to position the wipers 162 and 62 of the balancing potentiometers 160 and 60 to offset this signal caused by the vertical gyroscope displacement. At the same time the output of the velocity generator or speed responsive generator winding 80 will be impressed on the cathode of the first stage of amplification of amplifier 78 in a degenerative feedback circuit. Therefore, it will be seen that this vertical gyroscope potentiometer signal will be offset in the automatic pilot circuit by the movement of the balancing potentiometer 60 and offset in the control circuit for the amplifier 78 and servomotor 70 by the displacements of the first and second balancing potentiometers 60 and 160 in addition to the output of the speed responsive generator. As before the motor will operate to position the balancing potentiometer 60 toward a condition where it will wipe out the effect of the vertical gyroscope signal and the overall difference between the positions of the wipers on their respective windings or the difference in signals from the vertical gyroscope potentiometer and the balancing potentiometer 60 will be fed to the autopilot as a pure rate signal.

As heretofore indicated, the voltage divider wiper 76 cannot be adjusted on its winding 72, to give a pure displacement signal from the bridge formed by the vertical gyroscope potentiometer 11 and balancing potentiometer 60. Assume now that the wiper 76 is located at the lower extremity of winding 72 or is substantially in contact with the wiper 162 of the second balancing potentiometer 160. It will be seen with this arrangement that displacement of the vertical gyroscope wiper 20 relative to the winding 16 will cause a signal which will be impressed on the voltage divider 71 and inasmuch as the potential level at the wiper 162 is different from that at the grounded wiper 62 of balancing potentiometer 60 a portion of this signal will be applied to the amplifier 78 to cause the servomotor to operate at a slow rate of rotation. With this arrangement, and depending upon the speed of rotation of the servomotor only a small portion of the vertical gyroscope potentiometer signal will be wiped out by the balancing potentiometer 60 giving substantially a displacement signal but slightly modified by the rate at which the vertical gyroscope wiper was displaced relative to its winding. At intermediate adjustment points of the wiper 76 along the winding 72 this overall control signal from the bridge formed by the vertical gyroscope potentiometer 11 and the balancing potentiometer 60 will, as before, be proportioned with respect to the magnitude and the rate at which the vertical gyroscope wiper is displaced or more properly at the rate at which the aircraft is banked.

The present modification is particularly useful when it is desirous to have a finer adjustment on the rate signal to be applied to the automatic pilot control apparatus for the aircraft. In the present disclosure this rate signal as before is synthetic and is in reality a comparison of the signals supplied by the speed responsive generator output winding 80 and the bridge formed by the second balancing potentiometer 160 and the transformer secondary 13.

It should be noted that the present disclosure is intended to be illustrative only and that its application is not limited to automatic pilot control apparatus for aircraft. It will be noted that the subject invention provides a means for obtaining rate signals in alternating current control circuits from devices which normally would be responsive to magnitude only and that the output signals from this apparatus may be proportioned in effect as to magnitude and rate of change of the condition which effects the primary controller. Therefore the scope of the invention should be determined only by the appended claims.

I claim as my invention:

1. In control apparatus, an electrical signal generating device, a controller connected to said electrical signal generating device for operating the same, means for energizing said electrical signal generating device, a voltage divider means connected between said energizing means and said signal generating device and energized in proportion to the operation of said controller, a second signal generating device, means connecting said first and second signal generating devices into a circuit responsive to output signals from said first and second signal generating devices in such a manner that said second signal generating device operates to balance said first signal generating device, and means including a motor means variably energized from said voltage divider and operably connected to said second signal generating device to operate said second signal generating device in such a manner that the output signals to said circuit are in proportion to the rate of operation and magnitude of operation of said controller.

2. In control apparatus, an electrical signal device, a controller connected to said electrical signal device for operating the same, means for energizing said electrical signal device, a voltage divider means connected between said energizing means and said signal device and energized in proportion to the operation of said controller, a second signal device, means connecting said first and second signal devices into a circuit responsive to output signals from said first and second signal devices in such a manner that said second signal device operates to balance said first signal device, means including a motor means variably energized from said voltage divider and operably connected to said second signal device to operate said second signal device in such a manner that the output signals to said circuit are in proportion to the rate of operation and magnitude of operation of said controller, and means for manually adjusting said voltage divider.

3. In control apparatus, an electrical signal device, a controller connected to said electrical signal device for operating the same, means for energizing said electrical signal device, a voltage divider means connected between said energizing means and said signal device and energized in proportion to the operation of said controller, a second signal device, means connecting said first and second signal devices into a circuit responsive to output signals from said first and second signal devices in such a manner that said second signal device operates to balance said first signal device, means including a motor means variably energized from said voltage divider and operably connected to said second signal device to operate said second signal device in such a manner that the output signals to said circuit are in proportion to the rate of operation and magnitude of operation of said controller, means for manually adjusting said voltage divider to vary the output from said second signal device in proportion to said manual adjustment and operation of said controller, and speed responsive generator means operatively connected to said motor means and driven thereby, said generating means being connected in series with said voltage divider and supplying a signal in opposition to said means including said motor means to modify the operation of said motor means.

4. In motor control apparatus, a first motor to be positioned in accordance with the rate at which a condition changes, means for producing a first signal varying in accordance with the magnitude of the controlling condition, means for producing a second signal opposing said first signal, a slow operating second motor operatively connected to said second signal producing means, means responsive to the magnitude of said first signal for causing said second motor to operate said second signal producing means in such a manner as to tend to cause said second signal to nullify the effect of said first signal so that the combined values of said first and second signals are dependent upon the rate with which the magnitude of said condition is changed, and means responsive to the combined effects of said first and second signals for controlling said first motor.

5. In motor control apparatus, a first motor to be positioned in accordance with the rate at which a condition changes, means for producing a first signal varying in accordance with the magnitude of the controlling condition, means for producing a second signal opposing said first signal, a slow operating second motor operatively connected to said second signal producing means, means responsive to the magnitude of said first signal for causing said second motor to operate said second signal producing means at a rate dependent upon the magnitude of said first signal and in such a manner as to tend to cause said second signal to nullify the effect of said first signal so that the combined values of said first and second signals are dependent upon the rate with which the magnitude of said condition is changed, and means responsive to the combined effects of said first and second signals for controlling said first motor.

6. In motor control apparatus a first motor to be positioned in accordance with changes in a condition, a network means for controlling the operation of said motor and including a signal producing means varying in accordance with the magnitude of the condition and a balancing signal producing means operated by said first motor, a second signal producing means connected to said network and opposing the signal from said first named signal producing means, a slow operating second motor connected to said second signal producing means for operating the same, and means responsive to the signal from said first named signal producing means for controlling the operation of said second motor such that said second signal producing means operates to nullify the effect of said first signal producing means and produce a combined signal from said first and second signal producing means which is dependent upon the speed with which said condition changes.

7. In motor control apparatus, a first motor to be positioned in accordance with changes in a condition, means for producing a first signal varying in accordance with the magnitude of the condition, means for producing a second signal in accordance with the operation of said first motor, means for producing a third signal opposing said first signal, a slow operating second motor operatively connected to said third signal producing means, means responsive to the magnitude of said first signal for causing said second motor to operate said third signal producing means such that said third signal tends to nullify the effect of said first signal and so that the combined signal of said first and third signal producing means is dependent upon the rate with which the magnitude of the condition is changed, and means responsive to the combined effects of said first, second, and third signals for controlling said first motor.

8. In motor control apparatus a first motor to be positioned in accordance with changes in a condition, a network means for controlling the operation of said motor and including a signal producing means varying in accordance with the magnitude of said condition and a balancing signal producing means operated by said first motor, a second signal producing means connected to said network and opposing the signal from said first named signal producing means, a slow operating second motor connected to said second signal producing means for operating the same, and means responsive to the signal from said first named signal producing means for controlling the operation of said second motor such that said second signal producing means operates to nullify the effect of said first signal producing means and produce a combined signal from said first and second signal producing means which is in proportion to the speed with which said condition changes, and manual means for adjusting said means responsive to said first signal to vary the proportion that said combined signal bears to the speed with which said condition changes.

9. In control apparatus, a first electrical signal device, a controller connected to said electrical signal device for operating the same, a second electrical signal device, means connecting said first and second signal devices into a control circuit and adapting them to be energized from a source of power, said control circuit being adapted to control the energization of a first motor the movement of which operates said second signal device to balance in said control circuit the output from said first signal device, a third signal device connected between said first named signal device and the source of power and energized in proportion to the operation of said controller, means including a second motor means variably energized from said third signal device and connected to said first signal device such that the energization of said first motor is in proportion to the rate of operation and magnitude of operation of said controller.

10. In control apparatus, a first electrical signal device, a controller connected to said electrical signal device for operating the same, a second electrical signal device, means connecting said first and second signal devices into a control circuit and adapting them to be energized from a source of power, said control circuit being adapted to control the energization of a first electric motor the movement of which operates at said second signal device to balance said first signal device, a third signal device connected between said first named signal device and the source of power and energized in proportion to the operation of said controller, means including a second motor means variably energized from said third signal device and connected to said first signal device such that the energization of said first motor is in proportion to the rate of operation and magnitude of operation of said controller, and means for manually adjusting said third named signal device.

11. In motor control apparatus: first motor means; first signal producing means responsive to a change in a condition for producing a signal for controlling said first motor means; rebalance signal producing means; means operatively connecting said first motor means to said rebalance signal producing means; a slowly acting second motor means; second signal producing means; means operatively connecting said slowly acting second motor means to said second signal producing means; a network for controlling the energization of said first motor means including said rebalance signal producing means, said first signal producing means, said second signal producing means and connections therebetween; and a network for controlling the energization of said slowly acting motor means including said first signal producing means, said second signal producing means and connections therebetween; said operative connections between said first and second motor means and said signal producing means operated thereby and said connections of said network being such that said slowly acting second motor means always operates said second signal producing means so as to oppose said first signal producing means, so that the energization to said slowly acting second motor means is dependent upon the difference between the signals from said first signal producing means and said second signal producing means, so that the energization to said first motor means is dependent upon the difference between the signals from said first signal producing means and said second signal producing means combined with the signal from said rebalance signal producing means, and so that said first motor means and said second motor means operate simultaneously.

12. In motor control apparatus: first motor means; first signal producing means responsive to a change in a condition for producing a signal for controlling said first motor means; rebalance signal producing means; means operatively connecting said first motor means to said rebalance signal producing means; a slowly acting second motor means; second signal producing means; means operatively connecting said slowly acting second motor means to said second signal producing means; adjustable means; a network for controlling the energization of said first motor means including said rebalance signal producing means, said first signal producing means, said second signal producing means and connections therebetween; and a network for controlling the energization of said slowly acting motor means including said first signal producing means, said second signal producing means, said adjustable means and connections therebetween; said operative connections between said first and second motor means and said signal producing means operated thereby and said connections of said networks being such that said slowly acting second motor means always operates said second signal producing means so as to oppose said first signal producing means, so that the energization to said slowly acting second motor means is dependent upon the difference between the signals from said first signal producing means and said second signal producing means, so that the energization to said first motor means is dependent upon the difference between the signals from said first signal producing means and said second signal producing means combined with the signal from said rebalance signal producing means, and so that said first motor means and said second motor means operate simultaneously; and said adjustable means in said controlling network for said slowly acting second motor means being such so as to vary the extent that said second signal producing means opposes said first signal producing means from complete opposition to zero opposition.

13. In motor control apparatus: first motor means adapted to be operated in accordance with changes in the magnitude of a condition and with the rate of change of the magnitude of said condition; first signal producing means responsive to a change in magnitude of said condition for producing a signal for controlling said first motor means; rebalance signal producing means; means operatively connecting said first motor means to said rebalance signal producing means; a slowly acting second motor means; second signal producing means; means operatively connecting said slowly acting second motor means to said second signal producing means; adjustable means; a network for controlling the energization of said first motor means including said rebalance signal producing means, said first signal producing means, said second signal producing means and connections therebetween; and a network for controlling the energization of said slowly acting motor means including said first signal producing means, said second signal producing means, said adjustable means and connections therebetween; said operative connections between said first and second motor means and said signal producing means operated thereby and said connections of said networks being such that said slowly acting second motor means always operates said second signal producing means so as to oppose said first signal producing means, so that the energization to said slowly acting second motor means is dependent upon the difference between the signals from said first signal producing means and said second signal producing means, so that the energization to said first motor means is dependent upon the difference between the signals from said first signal producing means and said second signal producing means combined with the signal from said rebalance signal producing means, and so that said first motor means and said second motor means operate simultaneously; and said adjustable means in said controlling network for said slowly acting second motor means being such so as to vary the extent that said second signal producing means opposes said first signal producing means from complete opposition corresponding to said first motor means being operated only in accordance with the rate of change of the magnitude of said condition to zero opposition corresponding to said first motor means being operated only in accordance with the change in magnitude of said condition.

14. In motor control apparatus: first motor means; first signal producing means responsive to a change in a condition for producing a signal for controlling said first motor means; rebalance signal producing means; means operatively connecting said first motor means to said rebalance signal producing means; a slowly acting second motor means; second signal producing means; means operatively connecting said slowly acting second motor means to said second signal producing means; a network for controlling the energization of said first motor means including said rebalance signal producing means, said first signal producing means, said second signal producing means and connections therebetween; a network for controlling the energization of said slowly acting motor means including said first signal producing means, said second signal producing means and connections therebetween; said operative connections between said first and second motor means and said signal producing means operated thereby and said connections of said networks being such that said slowly acting second motor means always operates said second signal producing means so as to oppose said first signal producing means, so that the energization to said slowly acting second motor means is dependent upon the difference between the signals from said first signal producing means and said second signal producing means, so that the energization to said first motor means is dependent upon the difference between the signal from said first signal producing means and said second signal producing means combined with the signal from said rebalance signal producing means, and so that said first motor means and said second motor means operate simultaneously; and means in said controlling network for said slowly acting second motor means for varying the extent that said second signal producing means opposes said first signal producing means.

References Cited in the file of this patent
UNITED STATES PATENTS

| | | |
|---|---|---|
| 2,312,711 | Harrison | Mar. 2, 1943 |
| 2,525,967 | Smoot | Oct. 17, 1950 |
| 2,571,260 | Kutzler | Oct. 16, 1951 |
| 2,582,305 | Young | Jan. 15, 1952 |
| 2,630,282 | Halpert | Mar. 3, 1953 |
| 2,664,530 | Young | Dec. 29, 1953 |
| 2,698,148 | Gille | Dec. 28, 1954 |